(12) United States Patent
Jackson

(10) Patent No.: US 6,516,466 B1
(45) Date of Patent: Feb. 4, 2003

(54) METHOD AND APPARATUS FOR PORTABLE DIGITAL ENTERTAINMENT SYSTEM

(76) Inventor: Vincent C. Jackson, 11011 Sagevale, Houston, TX (US) 77089

( * ) Notice: Subject to any disclaimer, the term of this patent is extended or adjusted under 35 U.S.C. 154(b) by 908 days.

(21) Appl. No.: 08/641,956

(22) Filed: May 2, 1996

(51) Int. Cl.$^7$ ................................................. H04N 7/16
(52) U.S. Cl. .......................... 725/62; 725/87; 725/135; 455/412; 455/3.01
(58) Field of Search ........................... 348/6, 7, 10, 12; 455/3.1, 3.2, 4.1, 4.2, 5.1, 412, 3.01, 3.02, 3.03, 3.04, 3.05, 3.06; 725/62, 63, 105, 135, 136, 87, 91

(56) References Cited

U.S. PATENT DOCUMENTS 5,442,512 A * 8/1995 Bradbury ..................... 361/683
5,702,305 A * 12/1997 Norman et al. ............... 463/42

OTHER PUBLICATIONS

Owner's Manual, Bellsouth Digital Answering System, Model 2007/2007C, Pg. "Special Features".

* cited by examiner

Primary Examiner—Andrew Faile
(74) Attorney, Agent, or Firm—Jackie Lee Duke

(57) ABSTRACT

An improved method and apparatus for portable digital entertainment system which melds direct microwave communications with digital technology to provide a system for "on demand" distribution of digital data, such as songs or video games. The apparatus includes a microwave cellular tower capable of transmitting and receiving a plurality of digital transmissions, a storage unit of user selectable songs and games coupled to the microwave cellular tower through a selection processor for managing the exchange of song and game selections between the storage unit and the microwave cellular tower, and a plurality of user portable digital cellular devices exchanging digitally encoded transmissions with the microwave cellular tower in response to a user's song or game selection request. The portable digital cellular devices include a liquid crystal display window which allows a user to select a desired song to be heard or game to be played. This selection by the user causes the portable digital cellular device, which includes a built in microwave cellular transmitter/receiver to transmit a signal to a microwave digital cellular tower. This microwave digital cellular tower is coupled to a mass storage unit comprised of solid state memory chips which contains hundreds, perhaps thousands of musical or game selections. The microwave digital cellular tower also includes a computer or central processing unit to control the retrieval of the desired musical or game selection from the mass storage unit. When the Data Storage Communications Tower receives a selection request from a portable digital cellular device, the computer bills a customer's account, retrieves the selection from the mass storage unit and directs the selection to the microwave digital cellular tower for transmission to the user's portable digital cellular device.

18 Claims, 5 Drawing Sheets

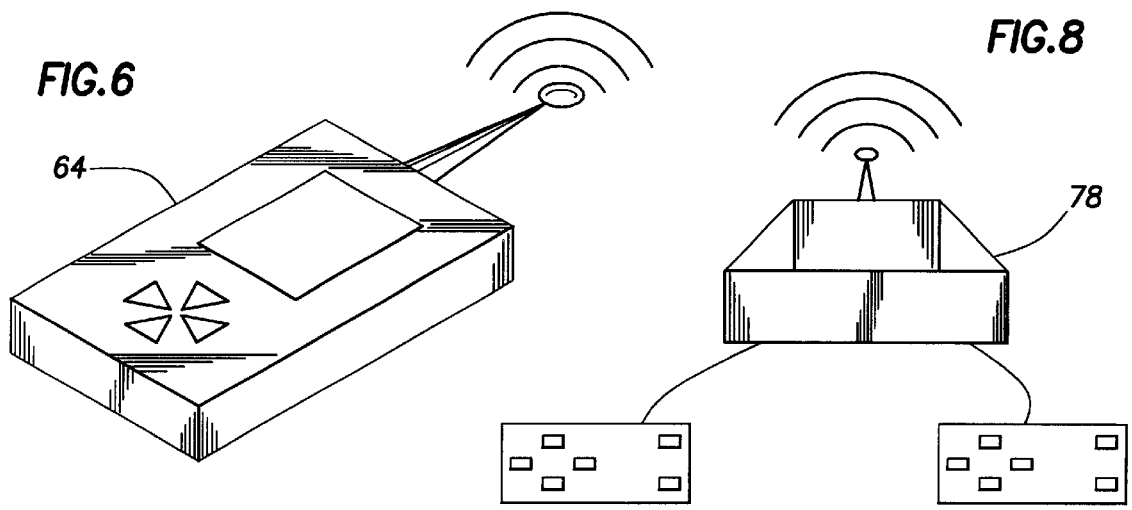
FIG. 6
FIG. 8
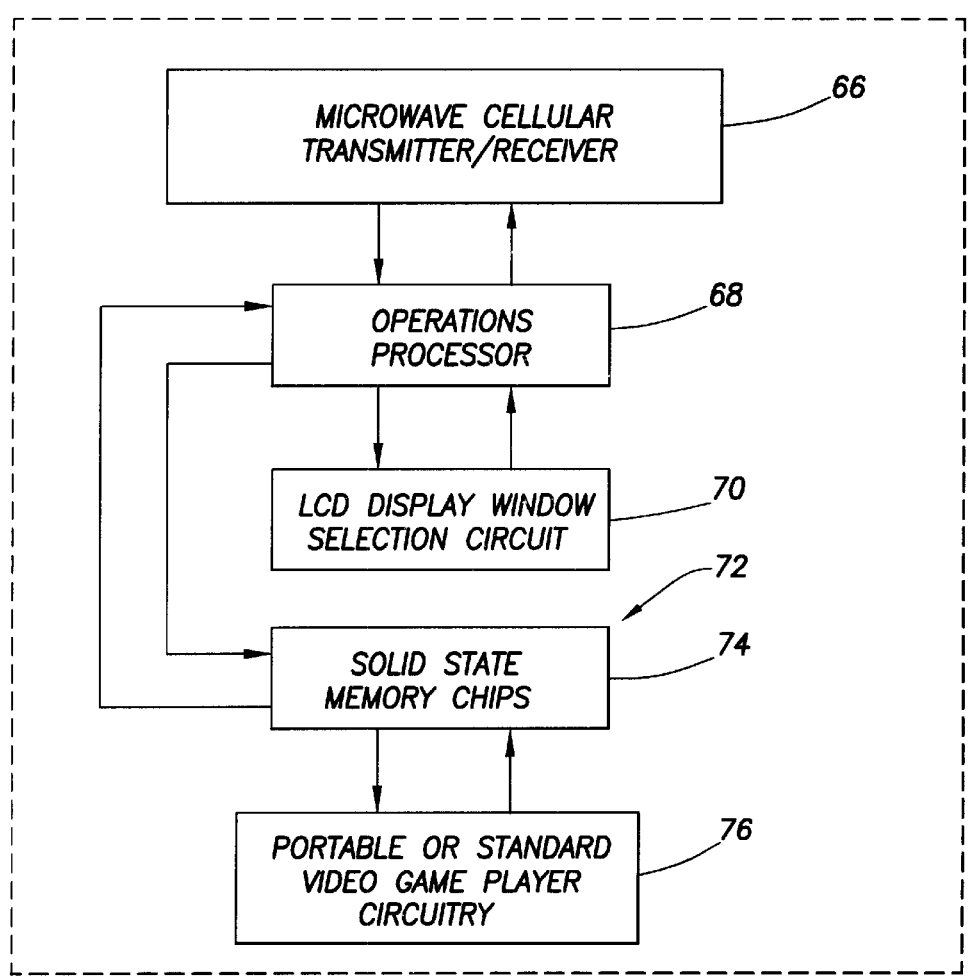
FIG. 7

METHOD AND APPARATUS FOR PORTABLE DIGITAL ENTERTAINMENT SYSTEM

BACKGROUND

This invention relates to a novel method and apparatus for combining a digital microwave communications network and compact disc player technology to provide music on demand without the need for a user to carry an armload of compact discs with them. This system lends itself to implementation with compact disc players of the portable kind, such as "Walkman" type players and those commonly found in homes and automobiles. The present invention further distinguishes itself by allowing video games on demand for use on player units, such as sold under the "Nintendo" or "Sega" trademarks.

Current technology favors entertainment devices that require the purchase of songs or games on cassettes, compact discs or other digitally encoded media. These systems require a user to purchase a unit suitable for playing the music or game desired, and to continue purchasing cassettes or compact discs to ensure a supply of new entertainment. After a while a user has amassed a considerable collection of these discs or cassettes, and must carry them along with the compact disc or game player wherever he goes if he wishes to have "portable" entertainment.

SUMMARY

The current invention melds direct microwave communications with digital technology to provide alternatives to the massive compact disc market. The first alternative takes the form of a device named the Portable Cellular Stereo, hereinafter "PCS," similar in size to current "Walkman" type compact disc players. The PCS includes a liquid crystal display window that allows a user to select a desired song to be heard. This selection by the user causes the PCS, which includes a built in microwave cellular transmitter/receiver, to transmit a signal to a Data Storage Communications Tower. This Data Storage Communications Tower includes a microwave digital cellular tower capable of transmitting and receiving a multitude of digital cellular signals from other PCS's. The Data Storage Communications Tower also includes a mass storage unit consisting of solid state memory chips that contain hundred, perhaps thousands of music selections. The Data Storage Communications Tower also includes a computer or central processing unit to control the retrieval of the desired music selection from the mass storage unit. When the Data Storage Communications Tower receives a selection request from a PCS, the computer bills a customer's account, retrieves the selection from the mass storage unit and directs the selection to the microwave digital cellular tower for transmission to the user's PCS. The microwave digital cellular tower can simultaneously transmit a list of available songs to the PCS, for display and review by the user. At current transmission speeds, a song that would play for seven minutes could be transmitted in less than a tenth of a second.

PCS's for use in an automobile or home could be further enhanced with the use of speech recognition technology. This additional circuitry allows for hands-free song selection. A user can speak the music selection wanted which will activate the speech recognition circuitry in the PCS. This circuitry will then transmit the desired selection to the Data Storage Communications Tower and the musical selection will be retrieved as described above.

Another alternative with the current invention is the Portable Cellular Gaming Unit, hereinafter "PCGU." This unit combines the "Gameboy" type game player with digital cellular technology similar to that described above to allow "on demand" games. The PCGU includes a liquid crystal display window that allows a user to select a game to play. This selection by the user causes the PCGU, which includes a built in microwave cellular transmitter/receiver, to transmit a signal to a Data Storage Communications Tower. This Data Storage Communications Tower is essentially the same unit as described above with the difference being the mass storage unit storing games in addition to or in lieu of musical selections. This Data Storage Communications Tower also includes a computer or central processing to control the retrieval of the desired game selection from the mass storage unit. When the Data Storage Communications Tower receives a selection request from a PCGU, the computer bills a customer's account, retrieves the game selection from the mass storage unit and directs the selection to the microwave digital cellular tower for transmission to the user's PCGU. The microwave digital cellular tower also can transmit simultaneously a list of available games to the PCGU, for display and review by the user. At current transmission speeds, a typical game could be transmitted in less than one-fifth (⅕) of a second.

Another alternative available with the current invention is the Home or Automotive Cellular Gaming Unit, hereinafter "HCGU." This unit combines the "Nintendo" or "Sega" type game player with digital cellular technology similar to that described above to allow "on demand" games. The HCGU utilizes a standard television as a display medium. The game players select a desired game to be played from a menu displayed on the television. This selection by the user causes the HCGU, which includes a built in microwave cellular transmitter/receiver, to transmit a signal to a Data Storage Communications Tower. In all other respects, the HCGU functions the same as the PCGU.

The principal objects of the present invention are: to provide a portable entertainment system using digital cellular technology that allows a user to retrieve and play a vast array of musical selections without the need to carry a large quantity of compact discs or similar media; to provide such a system that also allows a user to retrieve and play games on "Nintendo" or "SEGA" type game playing devices without the need for carrying game cartridges; and to provide such a system that is readily adaptable to speech recognition technology to allow use of such a system in a hands-free environment as while operating an automobile.

BRIEF DESCRIPTION OF THE DRAWINGS

These and other objects and advantages of the present invention are set forth below and further made clear by reference to the drawings, wherein:

FIG. 6 is a perspective view illustrating an embodiment of the portable cellular gaming unit for individual use.

FIG. 7 is a block diagram illustrating details of the user portable digital cellular devices of FIG. 6.

FIG. 8 is a perspective view illustrating an embodiment of the home cellular gaming unit for home or automobile use.

DESCRIPTION OF THE PREFERRED EMBODIMENTS

Figure 1:
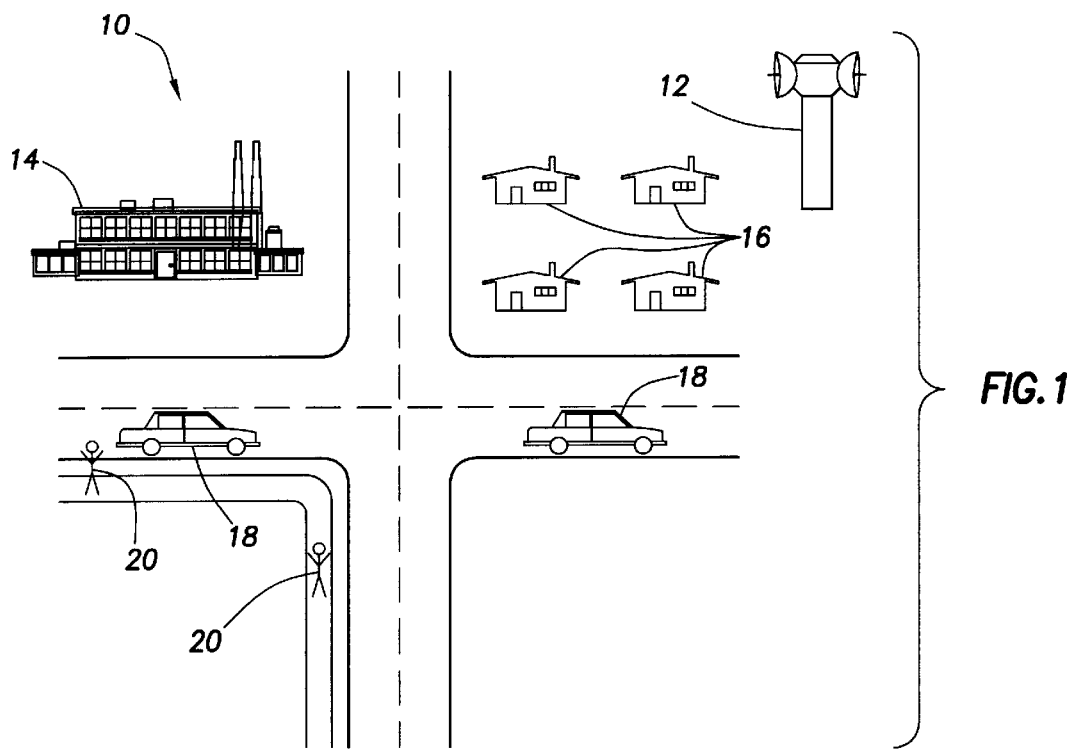
FIG. 1 is a perspective view illustrating a digital data distribution system made in accordance with the principles of the present invention.

FIG. 1 shows the environment in which the portable digital entertainment system, denoted by numeral 10, would be used. The system includes a microwave cellular tower 12 which is positioned in an urban environment to maximize the range of reception. The microwave cellular tower 12 could be positioned as a free standing tower or positioned on a multistory building, such as 14, shown in FIG. 1. Microwave cellular tower 12 transmits and receives digital cellular transmissions with portable digital cellular devices which are located in houses 16 and cars 18 or carried by individual users 20 as described hereinafter.

Figure 2:
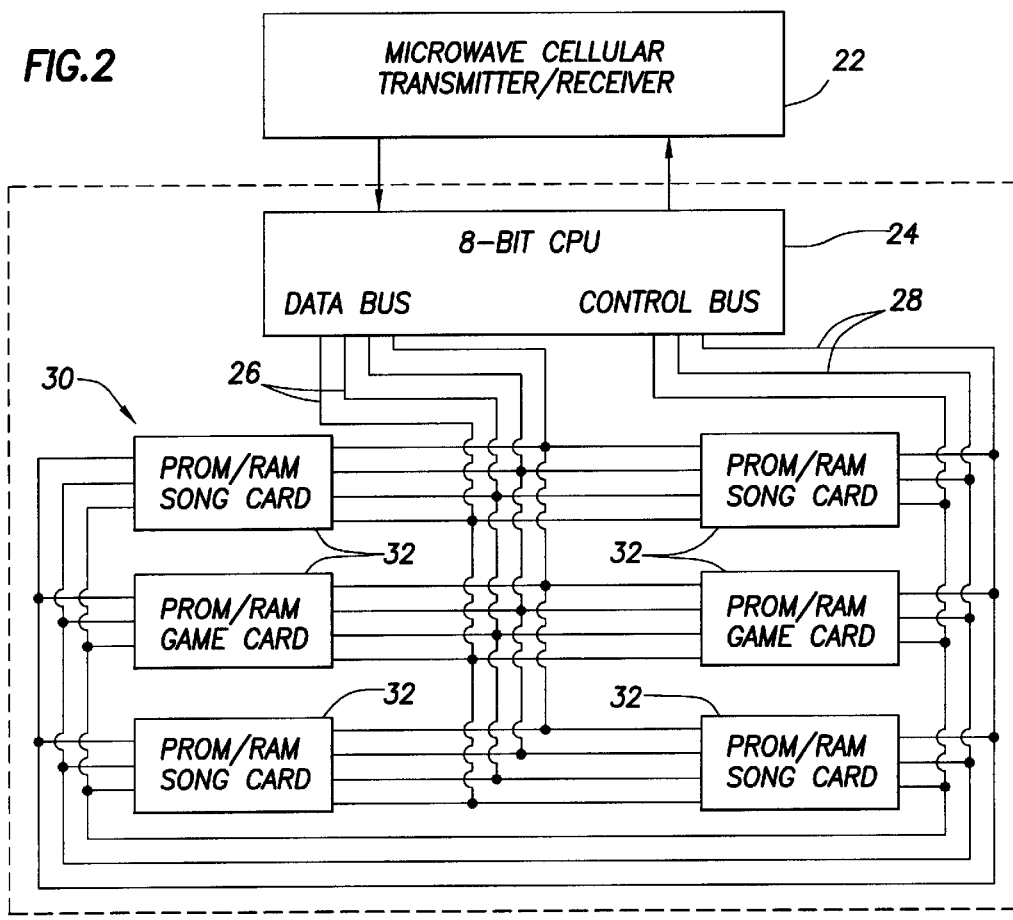
FIG. 2 is a block diagram illustrating further details of the microwave cellular tower, the selection processor and the storage unit.

FIG. 2 shows a specific illustrative embodiment of the microwave cellular tower 12 that includes a microwave cellular transmitter/receiver 22 coupled directly to a selection processor 24. Selection processor 24 is a commercially available 8 -bit central processing unit such as Intel 8086. Data bus lines 26 and control bus lines 28 are coupled to and controlled by selection processor 24. Data bus lines 26 and control bus lines 28 in turn are coupled to a storage unit 30 which includes solid state memory recording chips 32, such as conventional programmable read only memory ("prom") or random access memory ("ram").

Figure 3:
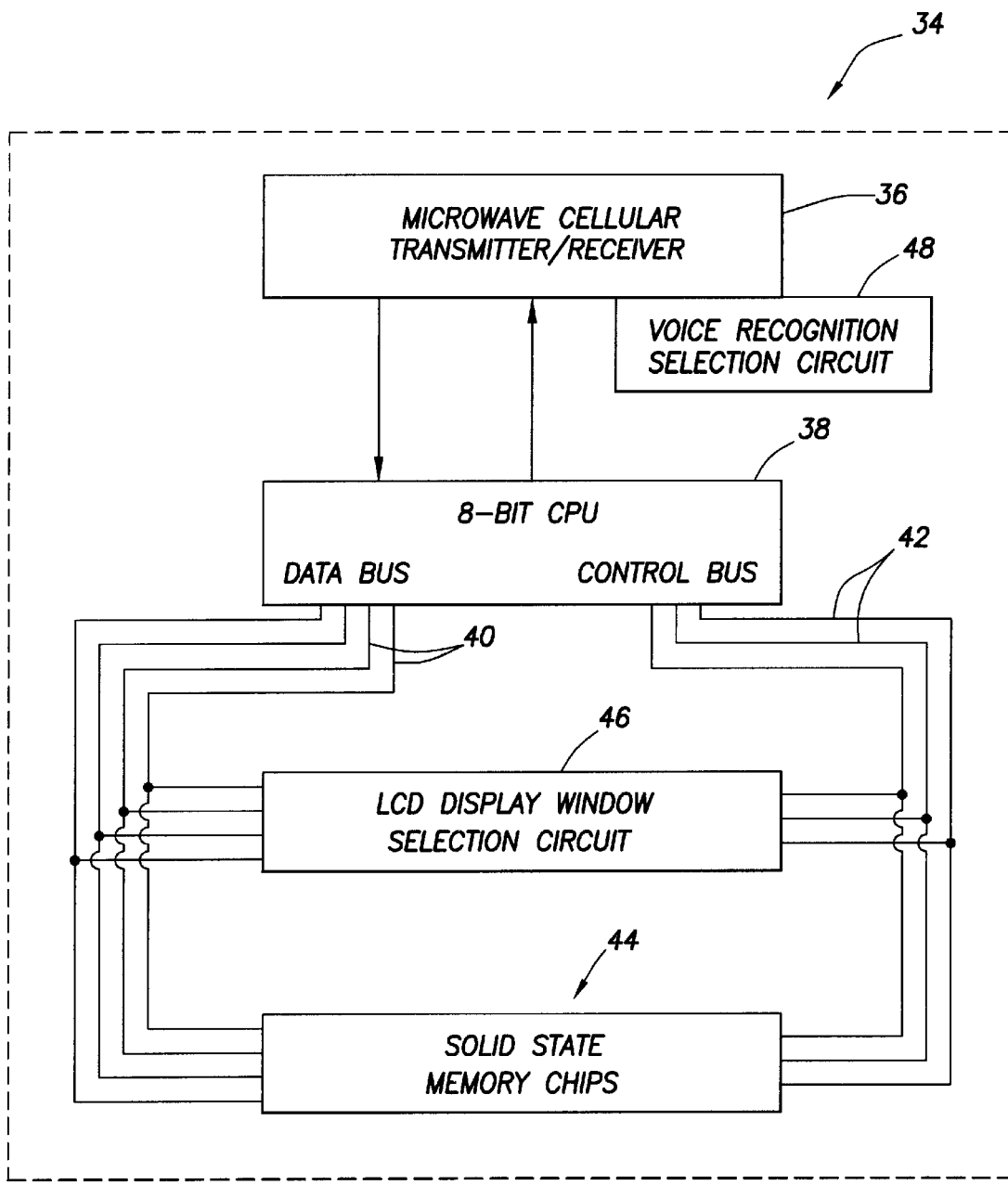
FIG. 3 is a block diagram illustrating details of the user portable digital cellular device particularly suited for use in an automobile.

FIG. 3 shows a specific illustrative embodiment of a portable digital cellular device 34 which would be most suitable for use in an automobile. The portable digital cellular device 34 is coupled to a conventional car radio or stereo system (not shown) and includes a microwave cellular transmitter/receiver 36 which is coupled directly to a selection processor 38. Selection processor 38 is a commercially available 8-bit central processing unit as described above. Data bus lines 40 and control bus lines 42 are coupled to and controlled by selection processor 38. Data bus lines 40 and control bus lines 42 in turn are coupled to a storage unit 44 which includes solid state memory recording chips as previously described. Additionally, portable digital cellular device 34 includes a liquid crystal display window 46 coupled to selection processor 38 and voice recognition selection circuit 48 coupled to microwave cellular transmitter/receiver 36.

In accordance with the present invention, the portable digital entertainment system 10 of FIGS. 1, 2 and 3 would be used in the following manner. A user would have the portable digital cellular device 34 installed in their automobile and coupled to their automobile radio or stereo system. Alternatively, the portable digital cellular device 34 could be designed to be part of the automobile radio or stereo system. A user would view the liquid crystal display window 46 and make a musical selection by speaking the title of the song desired. Voice recognition selection circuit 48 would then signal the microwave cellular transmitter/receiver 36 to transmit a signal to the microwave cellular tower 12 indicating the desired song. The microwave cellular transmitter/receiver 22 of microwave cellular tower 12 would receive the signal and send it to the selection processor 24. The selection processor 24 would bill a user's account and retrieve the desired musical selection via data bus lines 26 and control bus lines 28 from storage unit 30. The selection processor would then transmit the retrieved musical selection to microwave cellular transmitter/receiver 22 for transmission to the portable digital cellular device 34. The portable digital cellular device 34 would receive the transmission through its microwave cellular transmitter/receiver 36. The signal would then be processed by selection processor 38 that would store the song on solid state memory chips 44. The user could then play the song immediately or leave it in solid state memory chips 44 for playback later.

Figure 4A:
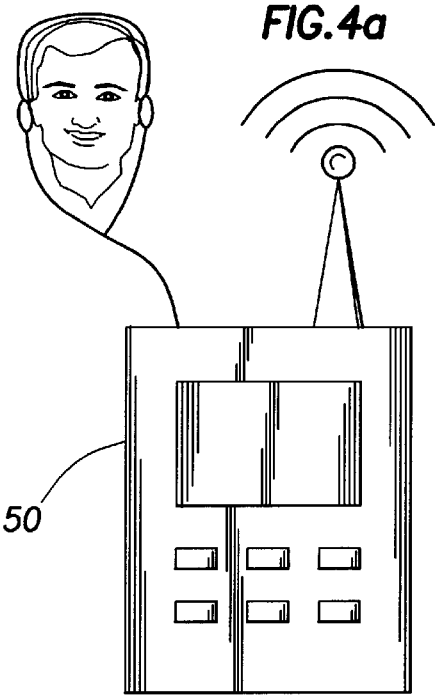
FIG. 4a is a perspective view illustrating one embodiment of the portable digital cellular device for individual use.
Figure 4B:
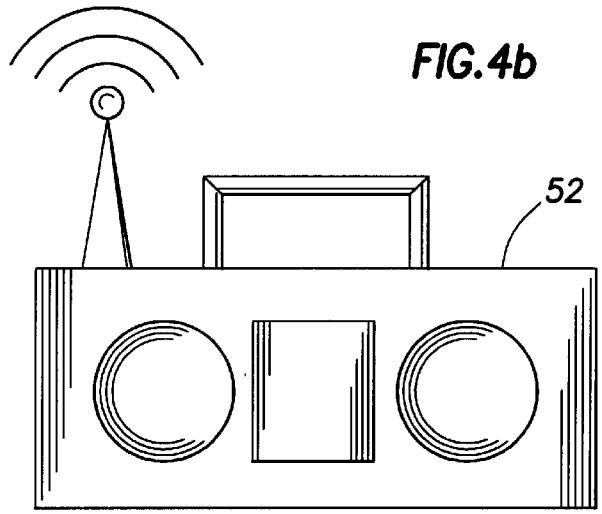
FIG. 4b is a perspective view illustrating another embodiment of the portable digital cellular device for individual use.
Figure 5:
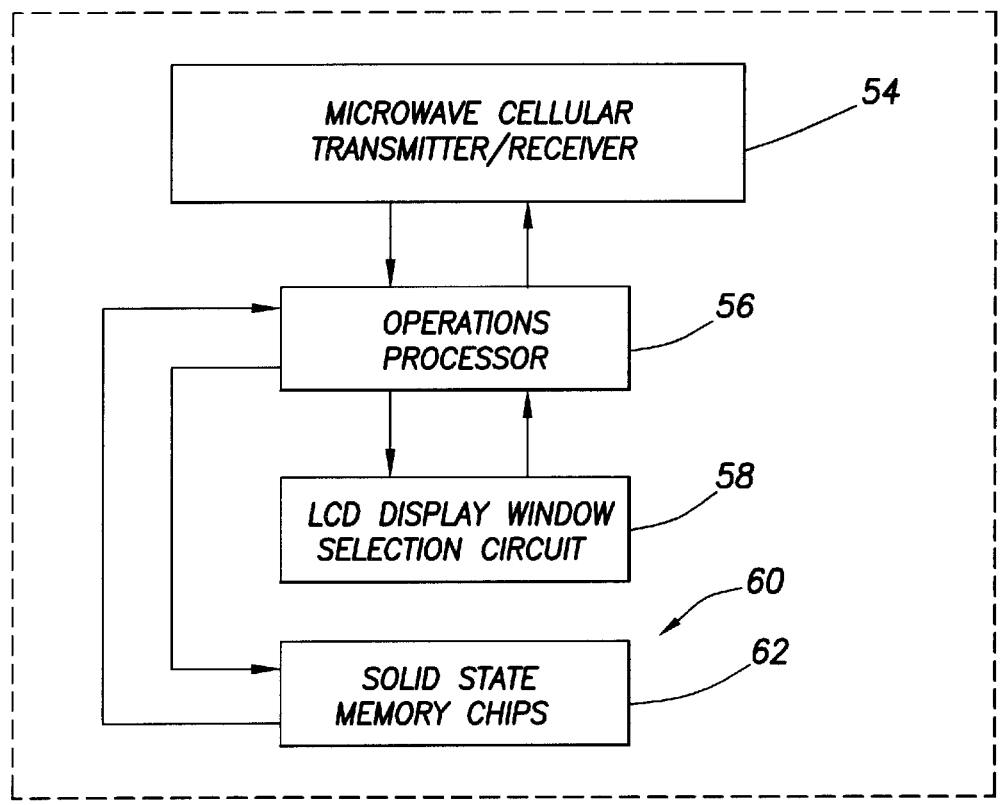
FIG. 5 is a block diagram illustrating details of the user portable digital cellular devices of FIGS. 4a and 4b.

FIGS. 4a and 4b show other illustrative embodiments of a portable digital cellular device that would be most suitable for personal use. The embodiment of FIG. 4a shows a "Walkman" type personal stereo 50 while FIG. 4b shows a "boombox" type personal stereo 52. These embodiments incorporate the circuitry of FIG. 5 to provide a portable digital cellular device according to the principles of the present invention. The circuitry of FIG. 5 is similar in all respects to that of FIG. 3. A microwave cellular transmitter/receiver 54 is coupled directly to an operations processor 56. Operations processor 56 is a commercially available 8-bit central processing unit as described above which is coupled to a liquid crystal display window 58. Operations processor 56 is also coupled to a storage unit 60 that includes solid state memory recording chips 62 as previously described. The circuitry of FIG. 5 works the same as that of FIG. 3 except for no voice recognition circuit being used. The user makes selections manually using the portable digital cellular devices of FIGS. 4a and 4b. The portable digital cellular devices of FIGS. 4a and 4b then send the signal to microwave cellular transmitter/receiver 22 of microwave cellular tower 12 in the manner previously described.

FIG. 6 shows an illustrative embodiment of a portable cellular gaming unit, hereinafter "PCGU." This unit combines the "Gameboy" type game player 64 with the digital cellular technology and circuitry previously described to provide "on demand" games. This embodiment incorporates the circuitry of FIG. 7 to provide a portable digital cellular device according to the principles of the present invention.

The circuitry of FIG. 7 is similar to that of FIGS. 3 and 5. A microwave cellular transmitter/receiver 66 is coupled directly to an operations processor 68. Operations processor 68 is a commercially available 8-bit central processing unit as described above which is coupled to a liquid crystal display window 70. Operations processor 68 is also coupled to a storage unit 72 that includes solid state memory recording chips 74 as previously described. The solid state memory recording chips 74 are in turn coupled to the portable or standard video game player circuitry 76.

In accordance with the present invention, the portable digital entertainment system 10 of FIGS. 1, 6, and 7 provide a portable cellular gaming unit that would be used in the following manner. A user would carry the portable cellular gaming unit or "Gameboy" type game player 64 with them. The user would view the liquid crystal display window 64 and make a game selection. The microwave cellular transmitter/receiver 66 would transmit a signal to the microwave cellular tower 12 indicating the desired game. The microwave cellular transmitter/receiver 22 of microwave cellular tower 12 would receive the signal and send it to the selection processor 24. The selection processor 24 would bill a user's account and retrieve the desired game selection via data bus lines 26 and control bus lines 28 from storage unit 30. The selection processor would then transmit the retrieved game selection to microwave cellular transmitter/receiver 22 for transmission to the "Gameboy" type game player 64. The "Gameboy" type game player 64 would receive the transmission through its microwave cellular transmitter/receiver 66. The signal would then be processed by operations processor 68 that would store the game on solid state memory chips 74. The player could then play the game immediately or leave it stored in the solid state memory chips 74 for play later.

FIG. 8 shows an illustrative embodiment of a Home or Automotive Cellular Gaming Unit 78, hereinafter "HCGU." This unit combines the "Nintendo" or "SEGA" type game player with the digital cellular technology and circuitry previously described to provide "on demand" games. The embodiment of FIG. 8 shows a game player suitable for two players to be used in an automobile or home use environment. This embodiment incorporates the circuitry of FIG. 9 to provide a portable digital cellular device according to the principles of the present invention.

Figure 9:
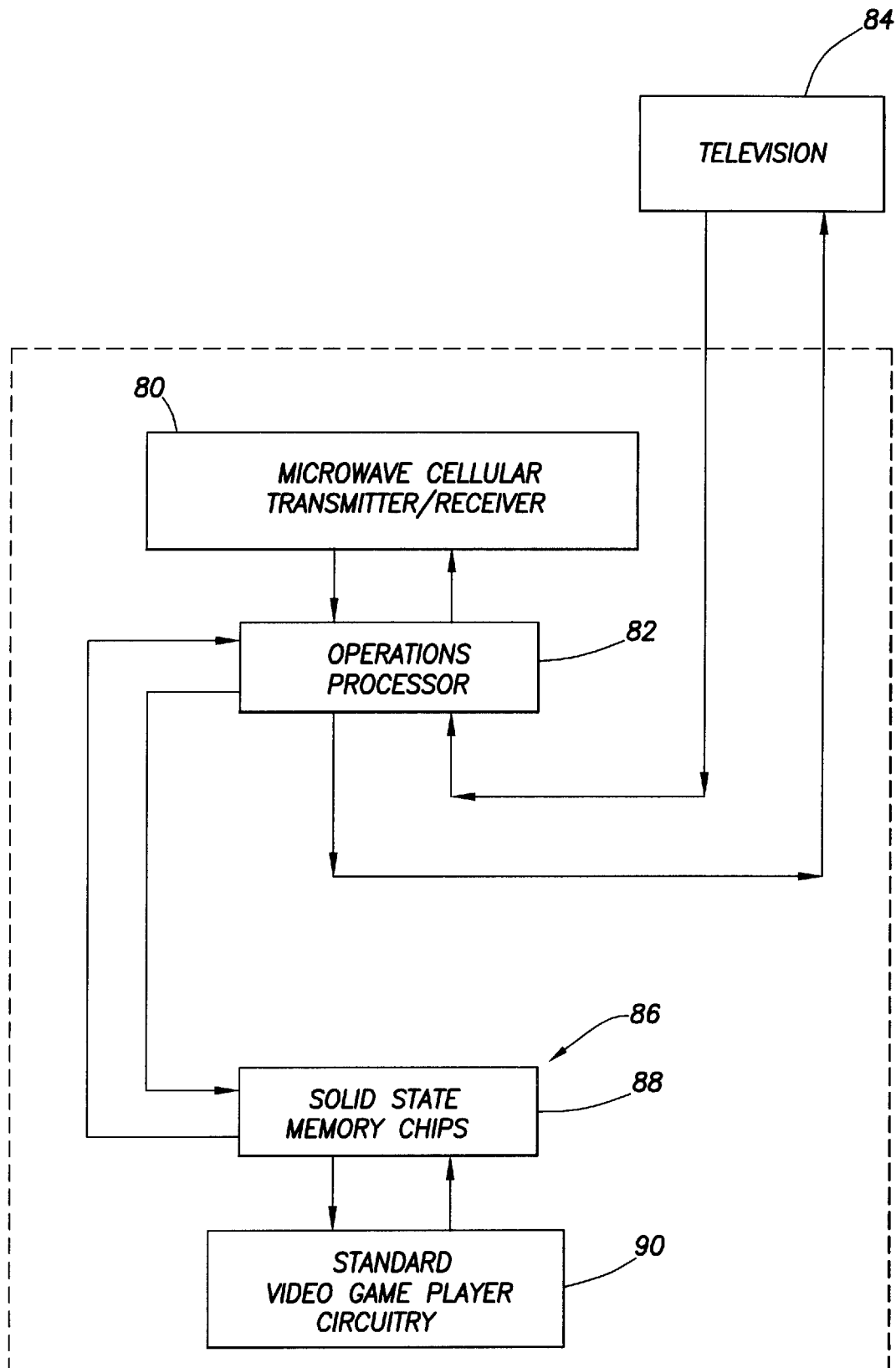
FIG. 9 is a block diagram illustrating details of the home cellular gaming unit for home or automobile use of FIG. 8.

The circuitry of FIG. 9 is similar to that of FIGS. 3, 5 and 7. A microwave cellular transmitter/receiver 80 is coupled directly to an operations processor 82. Operations processor 82 is a commercially available 8-bit central processing unit as described above which is coupled to television 84. Operations processor 82 is also coupled to a storage unit 86 that includes solid state memory recording chips 88 as previously described. The solid state memory recording chips 88 are in turn coupled to the standard video game player circuitry 90.

In accordance with the present invention, the portable digital entertainment system 10 of FIGS. 1, 8 and 9 provide a portable cellular gaming unit that would be used in the following manner. A user would have the home or automotive cellular gaming unit 78 installed in their home and coupled to their television. The players would view a selection menu on the television 84 and make a game selection. The microwave cellular transmitter/receiver 80 would transmit a signal to the microwave cellular tower 12 indicating the desired game. The microwave cellular transmitter/receiver 22 of microwave cellular tower 12 would receive the signal and send it to the selection processor 24. The selection processor 24 would bill a user's account and retrieve the desired game selection via data bus lines 26 and control bus lines 28 from storage unit 30. The selection processor would then transmit the retrieved game selection to microwave cellular transmitter/receiver 22 for transmission to the home or automotive cellular gaming unit 78. The home or automotive cellular gaming unit 78 would receive the transmission through its microwave cellular transmitter/receiver 90. The signal would then be processed by operations processor 82 that would store the game on solid state memory chips 88. The players could then play the game immediately or leave it in solid state memory chips 88 for play later. Alternatively, the home or automotive cellular gaming unit 78 could be designed to be installed in an automotive system which provided a television and sufficient AC power or a DC adapter.

The construction of my improved apparatus for portable digital entertainment system and the methods of its application will be readily understood from the foregoing description and it will be seen I have provided an improved apparatus for a portable digital entertainment system in which various types of digital entertainment or information can be made available to a user virtually anywhere in the world. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A dedicated cellular system for distribution of digital music and video games by microwave transmission, comprising:

a microwave cellular tower capable of transmitting and receiving a plurality of digital music and video games transmissions, a storage unit of user selectable music and video games connected to said microwave cellular tower, a selection processor for managing exchange of user selectable music and video games between said storage unit and said microwave cellular tower, and a plurality of dedicated user portable digital cellular devices exchanging digital music and video games transmissions with said microwave cellular tower in response to user selection of said user selectable music and video games.

2. A dedicated cellular system for distribution of digital music and video games by microwave transmission according to claim 1 wherein:

said storage unit includes solid state memory recording chips.

3. A dedicated cellular system for distribution of digital music and video games by microwave transmission according to claim 2 wherein:

said solid state memory recording chips are programmable read only memory storage devices.

4. A dedicated cellular system for distribution of digital music and video games by microwave transmission according to claim 2 wherein:

said solid state memory recording chips are random access memory storage devices.

5. A dedicated cellular system for distribution of digital music and video games by microwave transmission according to claim 2 wherein:

said selection processor includes a central processing unit and a multiplicity of data bus and control bus lines connected to said solid state memory recording chips.

6. A dedicated cellular system for distribution of digital music and video games by microwave transmission according to claim 5 wherein:

said central processing unit controls data flow through said multiplicity of data bus and control bus lines in response to user initiated selection input signals transmitted to said microwave cellular tower by said user portable digital cellular devices.

7. A dedicated cellular system for distribution of digital music and video games by microwave transmission according to claim 1 wherein said dedicated user portable digital cellular devices include:

a microwave cellular transmitter and receiver capable of transmitting and receiving digital cellular transmissions, a storage unit integral with said microwave cellular transmitter including solid state memory chips for storing user selectable music and video games received from said microwave cellular transmitter, an operations processor integral with said microwave cellular transmitter and said storage unit for managing exchange of user selectable music and video games between said storage unit and said microwave cellular transmitter, and a display window controlled by said operations processor for display of the currently selected user selectable music and video games.

8. A dedicated cellular system for distribution of digital music and video games by microwave transmission according to claim 7 wherein:

said solid state memory recording chips are programmable read only memory storage devices.

9. A dedicated cellular system for distribution of digital music and video games by microwave transmission according to claim 7 wherein:

said solid state memory recording chips are random access memory storage devices.

10. A dedicated cellular system for distribution of digital music and video games by microwave transmission according to claim 7 wherein:

said operations processor includes a central processing unit and a multiplicity of data bus and control bus lines connected to said solid state memory recording chips.

11. A dedicated cellular system for distribution of digital music and video games by microwave transmission according to claim 10 wherein:

said central processing unit controls data flow through said multiplicity of data bus and control bus lines in response to user initiated selection input signals.

12. A dedicated cellular system for distribution of digital music and video games by microwave transmission according to claim 11 wherein:

said user initiated selection input signals include voice recognition.

13. A dedicated cellular system for distribution of digital music and video games by microwave transmission according to claim 7 wherein said dedicated user portable digital cellular device further includes:

a means for processing said user selectable music and video games.

14. A method of operating a dedicated cellular system for distribution of digital music and video games by microwave transmission including a microwave cellular tower capable of transmitting and receiving a plurality of digital transmissions with a storage unit of user selectable music and video games connected to said microwave cellular tower, a selection processor for managing exchange of user selectable music and video games between said storage unit and said microwave cellular tower, and a plurality of dedicated user portable digital cellular devices exchanging digital music and video games transmissions with said microwave cellular tower in response to user selection of said user selectable music and video games, said method comprising the steps of:

transmitting a digital signal by microwave transmission from a dedicated user portable digital cellular device to a microwave cellular tower in response to a user request, receiving said digital signal by microwave transmission from said dedicated user portable digital cellular device to said microwave cellular tower, processing said digital signal by a selection processor for managing the exchange of user selectable music and video games between a storage unit and said microwave cellular tower, retrieving a user selected music or video game from said storage unit in response to instructions from said selection processor, and transmitting said user selected music or video game from said microwave cellular tower to said dedicated user portable digital cellular device.

15. A method of operating a dedicated cellular system for distribution of digital music and video games by microwave transmission according to claim 14 wherein:

said user request is voice activated.

16. A method of operating a dedicated cellular system for distribution of digital music and video games by microwave transmission according to claim 14 wherein:

said dedicated user portable digital cellular device is a portable cellular stereo.

17. A method of operating a dedicated cellular system for distribution of digital music and video games by microwave transmission according to claim 14 wherein:

said dedicated user portable digital cellular device is a portable cellular gaming unit.

18. A method of operating a dedicated cellular system for distribution of digital music and video games by microwave transmission according to claim 14 wherein:

said dedicated user portable digital cellular device is a home or automotive cellular gaming unit.

* * * * *